(12) United States Patent
Maani et al.

(10) Patent No.: US 11,412,255 B2
(45) Date of Patent: *Aug. 9, 2022

(54) LOGICAL INTRA MODE NAMING IN HEVC VIDEO CODING

(71) Applicant: SONY CORPORATION, Tokyo (JP)

(72) Inventors: Ehsan Maani, San Jose, CA (US); Ali J Tabatabai, Cupertino, CA (US); Jun Xu, Sunnyvale, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,854

(22) Filed: Mar. 9, 2021

(65) Prior Publication Data

US 2021/0195237 A1 Jun. 24, 2021

Related U.S. Application Data

(63) Continuation of application No. 16/737,164, filed on Jan. 8, 2020, now Pat. No. 11,012,712, which is a
(Continued)

(51) Int. Cl.
*H04N 19/593* (2014.01)
*H04N 19/70* (2014.01)
(Continued)

(52) U.S. Cl.
CPC ......... *H04N 19/593* (2014.11); *H04N 19/463* (2014.11); *H04N 19/61* (2014.11); *H04N 19/70* (2014.11)

(58) Field of Classification Search
CPC ...... H04N 19/593; H04N 19/11; H04N 19/50; H04N 19/103; H04N 19/129; H04N 19/109

See application file for complete search history.

(56) References Cited

U.S. PATENT DOCUMENTS

2005/0135484 A1 6/2005 Lee et al.
2009/0003443 A1 1/2009 Guo et al.
(Continued)

FOREIGN PATENT DOCUMENTS

CN 1674680 A 9/2005
CN 101087427 A 12/2007
(Continued)

OTHER PUBLICATIONS

Bross, et al., "High efficiency video coding (HEVC) text specification draft 6", Joint Collaborative Team on Video Coding (JCT-VC) of ITU-T SG16 WP3 and ISO/IEC JTC1/SC29/WG11, 8th Meeting, San José, CA, USA, JCTVC-H1003, Version 22, Feb. 1-10, 2012, pp. 1-259.
(Continued)

*Primary Examiner* — Jared Walker
(74) *Attorney, Agent, or Firm* — Chip Law Group

(57) ABSTRACT

A method and apparatus of using logical mode numbers during both prediction and coding in the bit stream, such as for high efficiency video coders (HEVC). These logical intra mode numbers are sorted based on angle which as a result leads to improved coding designs with fewer and smaller look-up tables, and a small gain in coding efficiency. Furthermore, by using this type of naming, the number of most probable modes (MPMs) can be readily extended since no additional tables are required. The use of three MPMs achieves a larger gain of 0.25% and 0.31% for the AI_HE and AI_LC cases, respectively.

12 Claims, 9 Drawing Sheets

Related U.S. Application Data continuation of application No. 16/163,269, filed on Oct. 17, 2018, now Pat. No. 10,623,772, which is a continuation of application No. 14/930,861, filed on Nov. 3, 2015, now Pat. No. 10,567,795, which is a continuation of application No. 13/674,646, filed on Nov. 12, 2012, now Pat. No. 9,210,438.

(60) Provisional application No. 61/589,221, filed on Jan. 20, 2012.

(51) Int. Cl.
*H04N 19/61* (2014.01)
*H04N 19/463* (2014.01)

(56) References Cited

U.S. PATENT DOCUMENTS

| | | |
|---|---|---|
| 2009/0161757 A1 | 6/2009 | Yu et al. |
| 2011/0158315 A1 | 6/2011 | Kim et al. |
| 2011/0164677 A1 | 7/2011 | Lu et al. |
| 2011/0176741 A1 | 7/2011 | Sato et al. |
| 2011/0243225 A1 | 10/2011 | Min et al. |
| 2011/0243230 A1 | 10/2011 | Liu |
| 2011/0249731 A1 | 10/2011 | Zhao et al. |
| 2011/0292994 A1 | 12/2011 | Lim et al. |
| 2012/0008675 A1 | 1/2012 | Karczewicz et al. |
| 2012/0041545 A1 | 2/2012 | Wyman et al. |
| 2012/0314766 A1 | 12/2012 | Chien et al. |
| 2013/0114712 A1 | 5/2013 | Yamamoto et al. |
| 2013/0188695 A1 | 7/2013 | Maani et al. |
| 2018/0176586 A1 | 6/2018 | Yamamoto et al. |

FOREIGN PATENT DOCUMENTS

| | | |
|---|---|---|
| CN | 101605255 A | 12/2009 |
| CN | 101631245 A | 1/2010 |
| CN | 101877792 A | 11/2010 |
| CN | 102176750 A | 9/2011 |
| CN | 102986227 A | 3/2013 |
| CN | 105681811 A | 6/2016 |
| JP | 2009-027541 A | 2/2009 |
| JP | 2014-514883 A | 6/2014 |
| JP | 2014-517630 A | 7/2014 |
| JP | 2014-528670 A | 10/2014 |
| JP | 2014-528903 A | 10/2014 |
| JP | 2014-529250 A | 10/2014 |
| JP | 2014-534484 A | 12/2014 |
| JP | 5798556 B2 | 10/2015 |
| JP | 6114787 B2 | 4/2017 |
| KR | 10-0679031 B1 | 2/2007 |
| KR | 10-2010-0028769 A | 3/2010 |
| WO | 2011/083599 A1 | 7/2011 |
| WO | 2011/126349 A2 | 10/2011 |
| WO | 2011/155377 A1 | 12/2011 |
| WO | 2012/008514 A1 | 1/2012 |
| WO | 2012/008515 A1 | 1/2012 |
| WO | 2012/023762 A2 | 2/2012 |
| WO | 2012/170812 A1 | 12/2012 |
| WO | 2012/172791 A1 | 12/2012 |
| WO | 2013/002556 A2 | 1/2013 |
| WO | 2013/037489 A1 | 3/2013 |
| WO | 2013/051903 A1 | 4/2013 |
| WO | 2013/062196 A1 | 5/2013 |
| WO | 2013/064100 A1 | 5/2013 |
| WO | 2013/109359 A1 | 7/2013 |

OTHER PUBLICATIONS

Maani, et al., "Intra mode coding using logical mode numbering", Joint Collaborative Team on Video Coding (JCT-VC) of ITU-T SG16 WP3 and ISO/IEC JTC1/SC29/WG11, 8th Meeting, San José, CA, USA, JCTVC-H0407, Version 3, Feb. 1-10, 2012, pp. 1-5.

Chien, et al., "Parsing friendly intra mode coding", Joint Collaborative Team on Video Coding (JCT-VC) of ITU-T SG16 WP3 and ISO/IEC JTC1/SC29/WG11, 6th Meeting, Torino, IT, JCTVC-F459, Version 1, Jul. 14-22, 2011, pp. 1-5.

Francois, et al., "CE6b: Mode ranking for remaining mode coding with 2 or 3 MPMs", Joint Collaborative Team on Video Coding (JCT-VC) of ITU-T SG16 WP3 and ISO/IEC JTC1/SC29/WG11, 7th Meeting, Geneva, CH, JCTVC-G242, Nov. 21-30, 2011, pp. 1-5.

Notice of Allowance for KR Patent Application No. 10-2020-0160667 dated Feb. 19, 2021, 03 pages of Notice of Allowance and 02 pages of English Translation.

Non-Final Office Action for U.S. Appl. No. 14/930,861, dated Jan. 14, 2019, 10 pages.

Final Office Action for U.S. Appl. No. 14/930,861, dated Feb. 9, 2018, 14 pages.

Advisory Action for U.S. Appl. No. 14/930,861, dated Apr. 4, 2018, 02 pages.

Notice of Allowance for U.S. Appl. No. 14/930,861, dated Jan. 8, 2020, 02 pages.

Notice of Allowance for U.S. Appl. No. 14/930,861, dated Oct. 28, 2019, 02 pages.

Notice of Allowance for U.S. Appl. No. 14/930,861, dated Oct. 21, 2019, 02 pages.

Notice of Allowance for U.S. Appl. No. 14/930,861, dated Sep. 24, 2019, 10pages.

Notice of Allowance for U.S. Appl. No. 14/930,861, dated May 15, 2019, 02 pages.

Notice of Allowance for U.S. Appl. No. 14/930,861, dated Apr. 26, 2019, 10 pages.

Notice of Allowance for U.S. Appl. No. 14/930,861, dated Aug. 1, 2018, 02 pages.

Notice of Allowance for U.S. Appl. No. 14/930,861, dated Oct. 31, 2018, 02 pages.

Notice of Allowance for U.S. Appl. No. 14/930,861, dated Jul. 5, 2018, 11 pages.

Notice of Allowance for U.S. Appl. No. 14/930,861, dated Sep. 17, 2018, 02 pages.

Notice of Allowance for U.S. Appl. No. 14/930,861, dated Aug. 16, 2018, 02 pages.

Notice of Allowance for U.S. Appl. No. 14/930,861, dated Oct. 3, 2018, 02 pages.

Notice of Allowance for U.S. Appl. No. 13/674,646, dated Aug. 3, 2015, 16 pages.

Office Action for JP Patent Application No. 2018-245316, dated Nov. 26, 2019, 07 pages of Office Action and 07 pages of English Translation.

Notice of Allowance for U.S. Appl. No. 14/930,867, dated Oct. 4, 2018, 02 pages.

Notice of Allowance for U.S. Appl. No. 14/930,867, dated Oct. 17, 2018, 02 pages.

Notice of Allowance for U.S. Appl. No. 14/930,867, dated Sep. 20, 2018, 02 pages.

Notice of Allowance for U.S. Appl. No. 14/930,867, dated Sep. 4, 2018, 02 pages.

Notice of Allowance for U.S. Appl. No. 14/930,867, dated Jul. 31, 2018, 02 pages.

Notice of Allowance for U.S. Appl. No. 14/930,867, dated Mar. 29, 2018, 15 pages.

Non-Final Office Action for U.S. Appl. No. 14/930,867, dated Sep. 18, 2017, 14 pages.

International Search Report and Written Opinion of PCT Application No. PCT/US2012/069023, dated Feb. 20, 2013, 15 pagesof ISRWO.

Notice of Allowance for U.S. Appl. No. 16/163,269, dated Jan. 21, 2020, 02 pages.

Notice of Allowance for U.S. Appl. No. 16/163,269, dated Feb. 6, 2020, 02 pages.

Notice of Allowance for U.S. Appl. No. 16/163,269, dated Mar. 11, 2020, 02 pages.

Notice of Allowance for U.S. Appl. No. 16/163,269, dated Dec. 4, 2019, 09 pages.

(56) References Cited

OTHER PUBLICATIONS

Office Action for KR Patent Application No. 10-2019-0110505, dated Dec. 2, 2019, 05 pages of Office Action and 04 pages of English Translation.
Chien, et al., "Parsing Friendly Intra Mode Coding", Joint Collaborative Team on Video Coding (JCT-VC) of ITU-T SG16 WP3 and ISO/IEC JTC1/SC29/WG11, 6th Meeting, Torino, JCTVC-F459, Jul. 14-22, 2011, 06 pages.
Office Action for KR Patent Application No. 10-2018-0162031, dated Sep. 25, 2019, 05 pages of Office Action and 05 pages of English Translation.
Office Action for KR Patent Application No. 10-2014-0135716, dated Aug. 1, 2019, 05 pages of Office Action and 04 pages of English Translation.
Office Action for KR Patent Application No. 10-2014-0135716, dated May 30, 2019, 04 pages of Office Action and 35 pages of English Translation.
Bross, et al, "High Efficiency Video Coding (HEVC) Text Specification Draft 6", Joint Collaborative Team on Video Coding (JCT-VC) of ITU-T SG16 WP3 and ISO/IEC JTC1/SC29/WG11, 8th meeting, San Jose, CA, USA, Feb. 1-10, 2012, 259 pages.
Francois, et al, "CE6b: Mode Ranking for Remaining Mode Coding with 2 or 3 MPMs", Joint Collaborative Team On Video Coding (JCT-VC) of ITU-T SG16 WP3 and ISO/IEC JTC1/SC29/WG11, Nov. 21-30, 2011, 06 pages.
Kumakura, et al, "Fixing the No. of MPM Candidates", Joint Collaborative Team on Video Coding (JCT-VC) of ITU-T SG16 WP3 and ISO/IEC JTC1/SC29/WG11, Jul. 14-22, 2011, 08 pages.
Office Action for CN Patent Application No. 201610620135.7, dated Jul. 18, 2018, 07 pages of Office Action and 13 pages of English Translation.
Office Action for CN Patent Application No. 201610621392.2, dated Jul. 18, 2018, 10 pages of Office Action and 15 pages of English Translation.
Office Action for CN Patent Application No. 201610620187.4, dated Aug. 1, 2018, 06 pages of Office Action and 10 pages of English Translation.
Kumakura, et al, "Intra Prediction Mode Coding Based on Direction Difference", Joint Collaborative Team on Video Coding (JCT-VC) of ITU-T SG16 WP3 and ISO/IEC JTC1/SC29/WG11, Jul. 14-22, 2011, 14 pages.
Maani, et al, "Intra Mode Coding Using Logical Mode Numbering", Joint Collaborative Team on Video Coding (JCT-VC) of ITU-T SG16 WP3 and ISO/IEC JTC1/SC29/WG11, Feb. 1-10, 2012, 06 pages.
Zhang, et al., "Non-CE6: Intra Mode Coding with Fixed Length Binarization", Joint Collaborative Team on Video Coding (JCT-VC) of ITU-T SG16 WP3 and ISO/IEC JTC1/SC29/WG11, Feb. 1-10, 2012, 06 pages.
Office Action for JP Patent Application No. 2017-199247, dated Aug. 7, 2018, 06 pages of Office Action and 05 pages of English Translation.
Ankur Saxena, "CE7: Mode-dependent DCTIDST Without 4*4 Full Matrix Multiplication for Intra Prediction", Joint Collaborative Team on Video Coding (JCT-VC) of ITU-T SG16 WP3 and ISO/IEC JTC1/SC29/WG11, 5th Meeting, Geneva, CH, Mar. 16-23, 2011, 05 pages.
Office Action for EP Patent Application No. 13150711.3, dated Jun. 15, 2018, 08 pages.
Office Action for EP Patent Application No. 16205989.3, dated Jun. 15, 2018, 09 pages.
Office Action for CN Patent Application No. 201610134084.7, dated Mar. 5, 2018, 08 pages of Office Action and 11 pages of English Translation.
Office Action for KR Patent Application No. 10-2014-0135716, dated Apr. 2, 2018, 04 pages of Office Action and 03 pages of English Translation.
Office Action for KR Patent Application No. 10-2014-0135722, dated Mar. 30, 2018, 04 pages of Office Action and 03 pages of English Translation.

Office Action for KR Patent Application No. 10-2014-0135720, dated Apr. 2, 2018, 04 pages of Office Action and 03 pages of English Translation.
Bross, et al, "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103, Nov. 21-30, 2011, 215 pages.
Office Action for CN Patent Application No. 201610136245.6, dated Apr. 19, 2018, 09 pages of Office Action and 10 pages of English Translation.
Office Action for JP Patent Application No. 2016-203275, dated Sep. 26, 2017, 05 pages of Office Action and 05 pages of English Translation.
Office Action for JP Patent Application No. 2016-203275, dated Aug. 15, 2017, 06 pages of Office Action and 05 pages of English Translation.
Xu, et al., "Improvements for SDIP", Joint Collaborative Team on Video Coding (JCT-VC) of ITU-T SG16 WP3 and SO/IEC JTC1/SC29/WG11, JCTVC-G354, 7th Meeting, Geneva, CH, Nov. 21-30, 2011, 03 pages.
Francois, et al, "On Intra Mode Coding", Joint Collaborative Team on Video Coding (JCT-VC) of ITU-T SG16 WP 3 and ISO/IEC JTC1/SC29/WG 11, JCTVC-10186, 9th Meeting, Geneva, CH, Apr. 27-May 7, 2012, 09 pages.
Extended European Search Report of EP Patent Application No. 16205989.3, dated May 29, 2017, 09 pages.
Office Action for EP Application No. 13150711.3, dated Jun. 22, 2016, 06 pages.
Wallendael et al., "Improved intra mode signaling for HEVC", International Conference on Multimedia and Expo, IEEE, Jul. 11, 2011, pp. 6.
Office Action for JP Patent Application No. 2013-019866, dated Dec. 4, 2013, 05 pages of Office Action, 04 pages of English Translation and 05 pages of Claims Examined.
Saxena, et al., "CE7: Mode-dependent DCT/DST for intra prediction in video coding," Joint Collaborative Team on Video Coding (JCT-VC) of ITU-T SG16 WP3 and ISO/IEC JTC1/SC29/WG11, Document: JCTVC-D033_r3, 4th Meeting, Daegu, KR, Jan. 2011, 07 pages.
Chuang, et al., "Luma Intra Prediction Mode Coding," Joint Collaborative Team on Video Coding (JCT-VC) of ITU-T SG16 WP3 and ISO/IEC JTC1/SC29/WG11, Document: JCTVC-F062_r1, 6th Meeting, Torino, IT, Jul. 2011, 05 pages.
Office Action for KR Patent Application No. 10-2013-0003327, dated Jan. 17, 2014, 04 pages of Office Action, 03 pages of English Translation and Claims Examined pp. 05-12.
Office Action for JP Patent Application No. 2017-199247, dated Jan. 31, 2019, 01 pages of Office Action and 03 pages of English Translation.
Wiegand, et al, "WD3: Working Draft 3 of High-Efficiency Video Coding", Joint Collaborative Team on Video Coding (JCT-VC) of ITU-T SG16 WP3 and ISO/IEC JTC1/SC29/WG11, 5th Meeting, Geneva, JCTVC-E603, Mar. 16-23, 2011, 15 pages.
Office Action for KR Patent Application No. 10-2018-0162031, dated Feb. 28, 2019, 06 pages of Office Action and 05 pages of English Translation.
Extended European Search Report of EP Application No. 19157408.6, dated Apr. 10, 2019, 12 pages.
Office Action for CN Patent Application No. 201610620135.7, dated Dec. 11, 2018, 07 pages of Office Action and 16 pages of English Translation.
Office Action for JP Patent Application No. 2017-199247, dated Sep. 25, 2018, 09 pages of Office Action and 08 pages of English Translation.
Office Action for CN Patent Application No. 201610136245.6, dated Oct. 12, 2018, 13 pages of Office Action and 08 pages of English Translation.
Office Action for EP Patent Application No. 13150711.3, dated Oct. 30, 2018, 07 pages of Office Action.
Tan, et al., "Non-CE6: Unification of the No. of Intra Prediction Modes", Joint Collaborative Team on Video Coding (JCT-VC) of ITU-T SG16 WP3 and ISO/IEC JTC1/SC29/WG11, 8th meeting, San Jose, JCTVC-H0166 Feb. 1-10, 2012, 03 pages.

(56) References Cited

OTHER PUBLICATIONS

Office Action for EP Patent Application No. 16205989.3, dated Oct. 30, 2018, 08 pages of Office Action.

Office Action for JP Patent Application No. 2017-199247, dated Nov. 13, 2018, 02 pages of Office Action and 32 pages of English Translation.

Decision to Dismiss the Amendment for JP Patent Application No. 2017-199247, dated Nov. 13, 2018, 05 pages of Office Action and 04 pages of English Translation.

Office Action for KR Patent Application No. 10-2014-0135716, dated Nov. 29, 2018, 06 pages of Office Action and 06 pages of English Translation.

Non-Final Office Action for U.S. Appl. No. 14/930,861, dated Sep. 18, 2017, 14 pages.

Chien, et al., "Parsing Friendly Intra Mode Coding", Joint Collaborative Team on Video Coding (JCT-VC) of ITU-T SG16 WP3 and ISOIIEC JTCI/SC29IWGII, 6th Meeting: Torino, IT, Jul. 14-22, 2011, 05 pages.

Wiegand, et al., "WD3: Working Draft 3 of High-Efficiency Video Coding", Joint Collaborative Team on Video Coding (JCT-VC) of ITU-T SG16 WP3 and ISO/IEC JTCI/SC29IWGII, 5th Meeting: Geneva, CH, Mar. 16-23, 2011, 160 pages.

Office Action for EP Patent Application No. 19157408.6 dated May 27, 2021, 05 pages of Office Action.

Office Action for JP Patent Application No. 2021-018229, dated Jan. 11, 2022, 02 pages of English Translation and 04 pages of Office Action.

Kumakura, et al., "Intra prediction mode coding based on direction difference", Joint Collaborative Team on Video Coding of ITU-T SG16 WP3 and ISO/IEC JTC1, JCTVC-F339, 6th Meeting, Torino, IT, Jul. 14-22, 2011, 13 pages.

Chien, et al., "Parsing friendly intra mode coding", Qualcomm, JCTVC-F459, 9 pages.

Chien, et al., "Parsing friendly intra mode coding", Joint Collaborative Team on Video Coding of ITU-T SG16 WP3 and ISO/IEC JTC1/SC29/WG11, JCTVC-F459, 6th Meeting Torino, IT, Jul. 14-22, 2011, 5 pages.

Francois, et al., "CE6b: Mode ranking for remaining mode coding with 2 or 3 MPMs", Joint Collaborative Team on Video Coding of ITU-T SG16 WP3 and ISO/IEC JTC1/SC29/WG11, JCTVC-G242, 7th Meeting, Geneva, CH, Nov. 21-30, 2011, 5 pages.

Maani, et al., "Intra mode coding using logical mode numbering", Joint Collaborative Team on Video Coding of ITU-T SG16 WP3 and ISO/IEC JTC1/SC29/WG11, JCTVC-H0407, 8th Meeting, San Jose, CA, USA, Feb. 1-10, 2012, 5 pages.

Zhang, et al., "Intra mode coding with fixed length binarization", Joint Collaborative Team on Video Coding of ITU-T SG16 WP3 and ISO/IEC JTC1/SC29/WG11, JCTVC-H0435, 8th Meeting, San Jose, Nov. 21-30, 2011, 5 pages.

```
If (iLeftIntraDir == iAboveIntraDir)
if (iLeftIntraDir > 1)
{
    uiIntraDirPred[0] = iLeftIntraDir;
    iLeftIntraDir-=2;
    uiIntraDirPred[1] = 2 + ((iLeftIntraDir-δ) & 0b1111);
    uiIntraDirPred[2] = 2 + ((iLeftIntraDir+δ) & 0b1111);
}
else
{
    uiIntraDirPred[0] = PLANAR_IDX; uiIntraDirPred[1] = DC_IDX;
    uiIntraDirPred[2] = VER_IDX;
}
```

FIG. 4A

```
Otherwise (when iLeftIntraDir != iAboveIntraDir)
uiIntraDirPred[0] = iLeftIntraDir;
uiIntraDirPred[1] = iAboveIntraDir;
if (iLeftIntraDir && iAboveIntraDir ) //angular or dc
{
        uiIntraDirPred[2] = PLANAR_IDX;
}
else
{
        uiIntraDirPred[2] = (iLeftIntraDir+iAboveIntraDir)<2? VER_IDX : DC_IDX;
}
```

FIG. 4B

LOGICAL INTRA MODE NAMING IN HEVC VIDEO CODING

CROSS-REFERENCE TO RELATED APPLICATIONS

This application is a continuation of U.S. patent application Ser. No. 16/737,164 filed on Jan. 8, 2020, which is a continuation of U.S. patent application Ser. No. 16/163,269 filed on Oct. 17, 2018, now U.S. Pat. No. 10,623,772, which is a continuation of U.S. patent application Ser. No. 14/930,861 filed on Nov. 3, 2015, now U.S. Pat. No. 10,567,795, which is a continuation of U.S. patent application Ser. No. 13/674,646 filed on Nov. 12, 2012, now U.S. Pat. No. 9,210,438, which claims priority from U.S. provisional patent application Ser. No. 61/589,221 filed on Jan. 20, 2012, the entire content of which is hereby incorporated by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to video coding, and more particularly to intra mode naming with high-efficiency video coding devices.

2. Description of Related Art

Currently there are two types intra mode names (numbering) used in High Efficiency Video Coding (HEVC) test model HM5.0, the logical mode numbers and bit stream mode numbers. Logical mode numbers are more meaningful and are directly used in the prediction module to produce the intra prediction. In HEVC the logical bit numbers span across vertical directions VER−8, VER−4, VER, VER+4, VER+8, into the horizontal HOR−4, HOR, HOR+4, which are numbered, with up to 34 prediction directions. Bit stream mode numbers are used to signal the mode to the decoder, and in some implementations, such as HM5.0, may require many look-up tables (e.g., Mode Dependent (MD) coefficient scan, intra smoothing, intra prediction and Mode Dependent (MD) transform) in the programming of the video coding device. Bit stream mode numbers were utilized with advanced video coding (AVC) coding and considered to be sorted in their frequency of occurrences. However, statistics collected on High Efficiency Video Coding (HEVC), do not indicate any bias towards any of the angular directions (not including Planar and DC), while bypass coding is utilized for the remaining modes.

BRIEF SUMMARY OF THE INVENTION

Logical intra mode naming in High Efficiency Video Coding (HEVC) of the present invention utilizes logical mode names and numbering for all mode uses and thus replaces the use of bit stream mode numbers. The logical modes have meaningful numbering (naming) for intra modes. It will be noted that in HEVC, a coding unit (CU) may have variable block sizes depending on video content, and may be split into smaller blocks for prediction as Prediction Units (PU) or transform as Transform Units (TU). Prediction units (PU) can be thought of similarly to partitions described in other video coding standards, such as the H.264 standard.

When blocks are encoded in intra mode, a prediction block is formed based on previously encoded and reconstructed blocks adjacent to the current block, the prediction block is configured for being subtracted from the current block prior to encoding. There are different prediction modes for these blocks which define a method of generating a signal from previously encoded blocks, for example including prediction types and directions. Encoders and decoders implemented with high efficiency video coding utilize both logical mode numbers and bit stream mode numbers. At the level of the PUs, intra prediction is performed from samples already decoded in adjacent PUs. Different modes can exist for these PUs, including DC (average), up to 33 angular directions and planar mode.

Using this inventive method, the coding decisions can be simplified by utilizing the same set of logical mode numbers for both prediction and coding for communication to a decoder. Although the following discusses making these decisions in response to the use of look up tables, it should be appreciated that the simplification is also applicable when the decisions are made using other software mechanisms, such as conditional statements, jump tables, pointer references and so forth. By way of example and not limitation, a number of tables related to intra mode coding can be typically eliminated to simplify HEVC encoders and decoders according to the invention (e.g., eliminating tables: g_aucIntraDirToScanIdx, m_aucIntraFilter, g_aucAngIntraModeOrder, g_aucDCTDSTMode_Hor, g_aucDCTDSTMode_Ver in HM5.0). In addition, design and implementation of fast encoders can be simplified using these logical intra mode names.

Furthermore, a method is taught herein for utilizing the three Most Probable Modes (MPMs) instead of the two currently used in HEVC coding. It will be appreciated that most probable modes (MPMs) are a mechanism for optimizing the coding process. More particularly, probabilities are estimated for optimal intra direction as the most probable mode (MPM) of its neighboring blocks, because current blocks have a strong correlation with patterns found in neighboring blocks. These MPMs, including the third MPM, are derived using logical numbering without additional look up tables. The method of determining multiple most probable modes (MPMs) is shared by both encoder and decoder.

Logical mode numbers according to the invention are utilized for both performing prediction and coding in the bit stream. These logical mode numbers are numbered, named or sorted based on angle according to the invention. For the sake of simplicity of discussion, the following will describe these as being mode numbers, although one of ordinary skill in the art will appreciate that naming and sorting can be similarly utilized. By way of example, the logical mode numbering is performed with respect to an arbitrary reference, and these are more beneficially meaningful as they result in an improved design with the removal of several otherwise necessary look-up tables. In addition to many simplifications that result from this type of numbering, simulations indicate a small coding efficiency benefit. Furthermore, by using this type of naming, adding an additional MPM is very efficient since no additional tables are required.

Utilizing the inventive method, fast intra mode decision algorithms can be simplified. Since modes provide a clear link (association) between numbers (names) and angular directions it is easier to apply various Fast Mode Decision (FMD) algorithms, such as utilizing a hierarchical approach. In addition, the method can facilitate or simplify other algorithms, for example deriving neighboring and perpendicular modes to simplify algorithms, such as three MPM algorithms. Thus, utilizing an association between logical intra mode names and angular directions allows simplifying decision logic and look-up tables, or elimination of certain look-up tables altogether.

The inventive apparatus and method is applicable to video coding devices implemented according to the HEVC standard and similar video systems which would be enhanced by the intra mode naming taught herein.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIGS. 4A and 4B are pseudo code instructions of using logical intra mode naming according to an embodiment of the present invention.

DETAILED DESCRIPTION OF THE INVENTION

The present invention utilizes a form of logical mode numbers, which are enough to describe the directions and which also can be directly coded into the bit stream instead of using bit stream mode numbers. Using the inventive logical mode numbers throughout the coding system provides multiple advantages, including the following.

(1) Designs are improved using meaningful mode numbers. Given an intra mode number, its directional angle can be determined with simple calculations without the need of look-up tables. In addition, it can be deduced from the mode numbering that adjacent mode numbers represent adjacent prediction directions.

(2) Simple mapping is provided. Using logical mode numbers, a simple operation can be performed, for instance clearing the least significant bit in performing mapping for HM5.0, where 4×4 PU has different number of valid modes from larger PUs. In certain coding systems to avoid mapping, planar mode is utilized for 4×4 PU, whereas an angular mode should be selected. The invention is also applicable for implementations having the same number of modes.

(3) Several look-up tables can be removed utilizing the inventive method. In addition, intra smoothing, mode dependent coefficient scan, and mode dependant transform do not require large tables to determine smoothing filters, scan index, or transform type (DCT/DST). Simple mode range checking is utilized according to at least one embodiment for determining the criteria for which different smoothing filters, scans, or transforms can be applied. Furthermore, there is no need for look up tables to convert bit stream mode numbers to logical numbers and vice versa.

(4) Since the mode numbers in the present invention are indicative of their angle, design of a fast mode decision for a real time encoder is far simpler. Also coarse decisions can be reached quickly, for example first testing a lower resolution of the directions and based on that result, only modes close to the best one can be tested in the second stage.

(5) The logical mode numbering makes it simple to compute adjacent directions. In considering these inventive embodiments, such as those involving more than two MPMs, directions are utilized which are adjacent to the neighboring intra mode. Coding system implementations according to these embodiments can be greatly simplified since the adjacent directions are computed with simple arithmetic means, such as just by incrementing or decrementing the neighbouring mode number (depending on PU size). The invention also applies in cases having the same numbers of increments and decrements.

Figure 1:
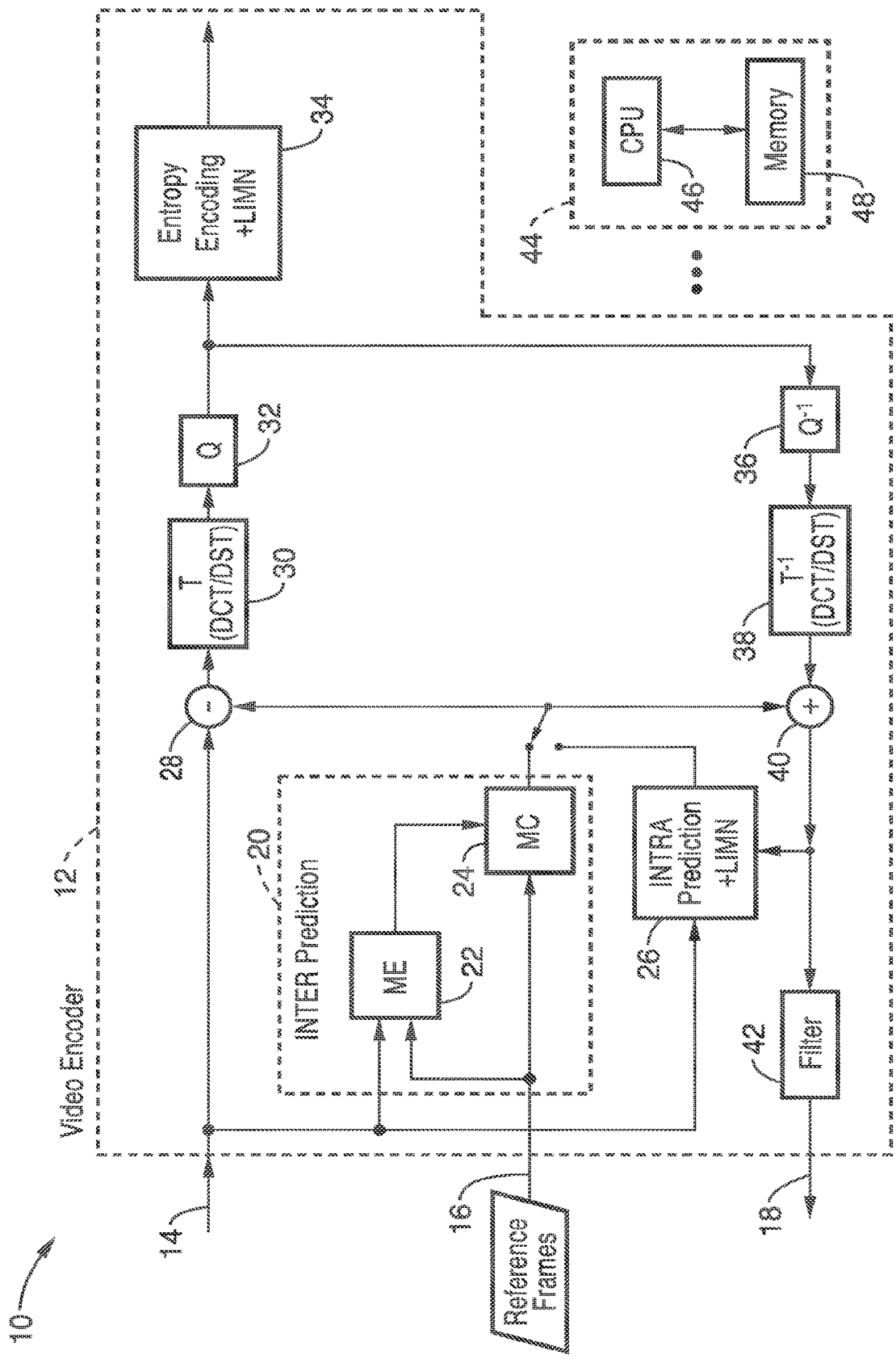
FIG. 1 is a schematic of a video encoder using logical intra mode naming according to an embodiment of the present invention.

FIG. 1 illustrates an example embodiment of a coding apparatus comprising an encoder 10 according to the invention for utilizing logical intra mode naming (LIMN). The invention is implemented in both the entropy encoding block 34 and intra prediction block 26, shown containing generalized logical intra mode naming (LIMN), but otherwise can rely on conventional video coding which maximizes compatibility with coding systems. It should be appreciated that other blocks of the encoder may be optimized in response to the inventive teachings.

The encoder 10 is shown with encoding elements 12 executed by one or more processors 44. In the example, video frame input 14 is shown along with reference frames 16 and frame output 18. Inter-prediction 20 is depicted with motion estimation (ME) 22 and motion compensation (MC) 24. Intra prediction 26 is shown which operates with the logical intra mode naming (LIMN) of the invention and switching is depicted between inter prediction and intra prediction. A sum junction 28 is shown with output to a forward transform 30, operating with Discrete Cosine Transforms (DCT) and/or Discrete Sine Transforms (DST) which are performed based on the predictions to generate transform coefficients of residual data. Quantization of the transform coefficients is performed at quantization stage 32, which is followed by entropy encoding 34, which also utilizes logical intra mode naming (LIMN). Inverse quantization 36 and inverse transform 38 operations are shown coupled to a summing junction 40 followed by a filter 42, such as a deblocking and/or loop filter and/or sample adaptive offset.

It should be appreciated that the encoder is shown implemented with a processing means 44, such as comprising at least one processing device (e.g., CPU) 46 and at least one memory 48 for executing programming associated with the encoding. In addition, it will be appreciated that elements of the present invention can be implemented as programming stored on a media, which can be accessed for execution by a CPU for the encoder 10 and/or decoder 50.

Figure 2:
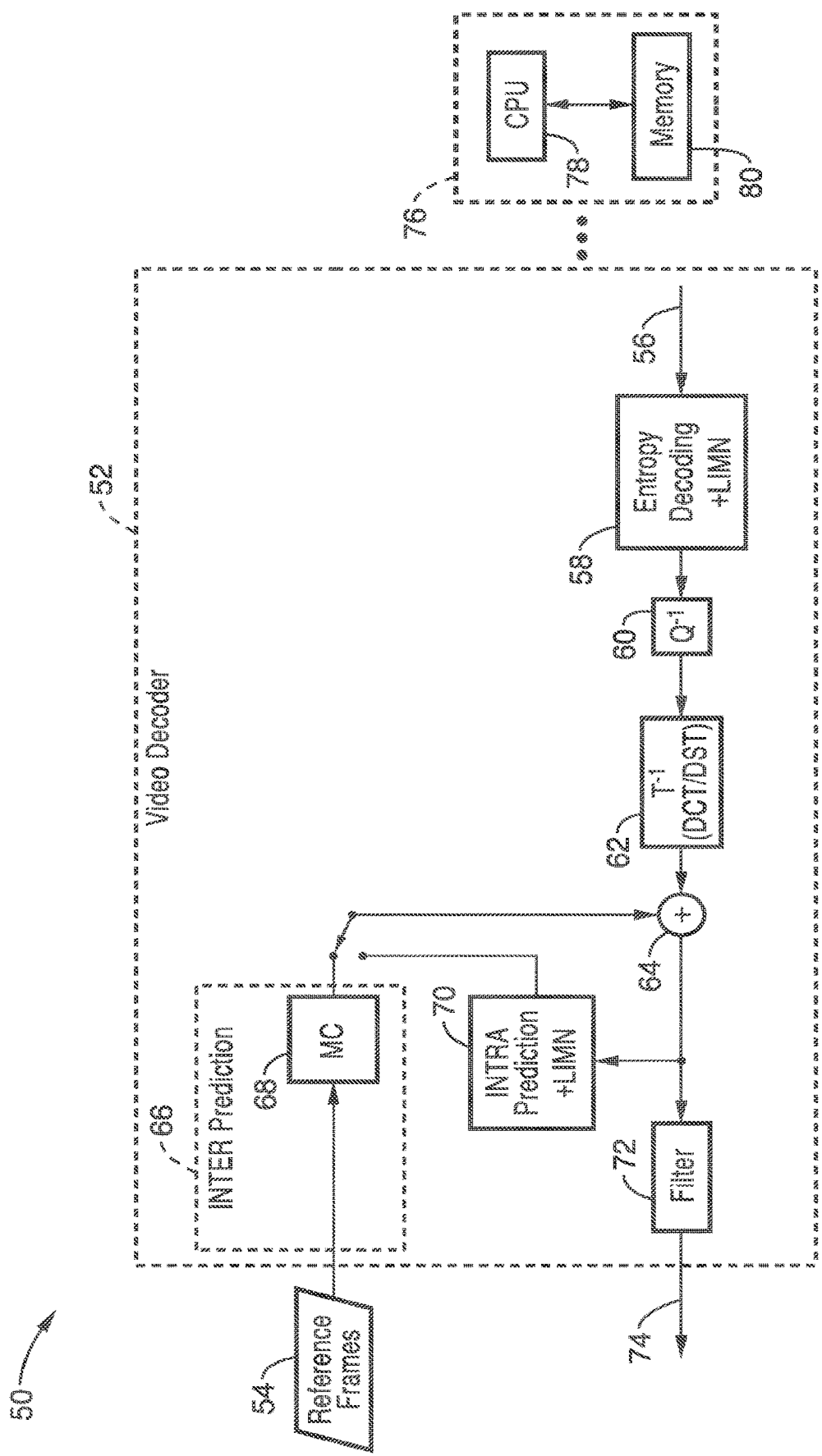
FIG. 2 is a schematic of a video decoder using logical intra mode naming according to an embodiment of the present invention.

FIG. 2 illustrates an example embodiment 50 of a decoder, shown with process blocks 52 and an associated processing means 76. It will be noted that the decoder is substantially a subset of the elements contained in encoder 10 of FIG. 1, operating on reference frames 54, encoded video signal 56 and outputting video 74. Decoder 50 utilizes logical intra mode naming (LIMN) during entropy decoding and intra prediction, although the information can also be utilized in other decoding process steps toward increased efficiency. The decoder blocks receive an encoded video signal 56 which is processed through entropy decoder 58 which utilizes the inventive logical intra mode naming (LIMN). Following entropy decoding is inverse quantization 60, inverse transform 62, and summing 64 between the inverse transform 62 output and the selection between inter prediction 66 shown with motion compensation 68, and a separate intra prediction block 70. It will be noted that inter prediction also utilizes the logical intra mode naming (LIMN). Output from summing junction 64 is received by filter 72, which can be configured as a loop filter, a deblocking filter, sample adaptive offset, or any combination thereof. It should be appreciated that the decoder can be implemented with a processing means 76 which comprises at least one processing device 78 and at least one memory 80 for executing programming associated with the decoding. In addition, it will be noted that elements of the present invention can be implemented as programming stored on a media, wherein said media can be accessed for execution by processing device (CPU) 78.

It will be recognized that elements of the present invention 10 and 50 are implemented for execution by a processing means 44 and 76, such as in response to programming resident in memory 48 and 80 which is executable on computer processor (CPU) 46 and 78. In addition, it will be appreciated that elements of the present invention can be implemented as programming stored on a media, wherein said media can be accessed for execution by CPU 46 and 78.

It should be appreciated that the programming is executable from the memory which is a tangible (physical) computer readable media that is non-transitory in that it does not merely constitute a transitory propagating signal, but is actually capable of retaining programming, such as within any desired form and number of static or dynamic memory devices. These memory devices need not be implemented to maintain data under all conditions (e.g., power fail) to be considered herein as non-transitory media.

Figure 3:
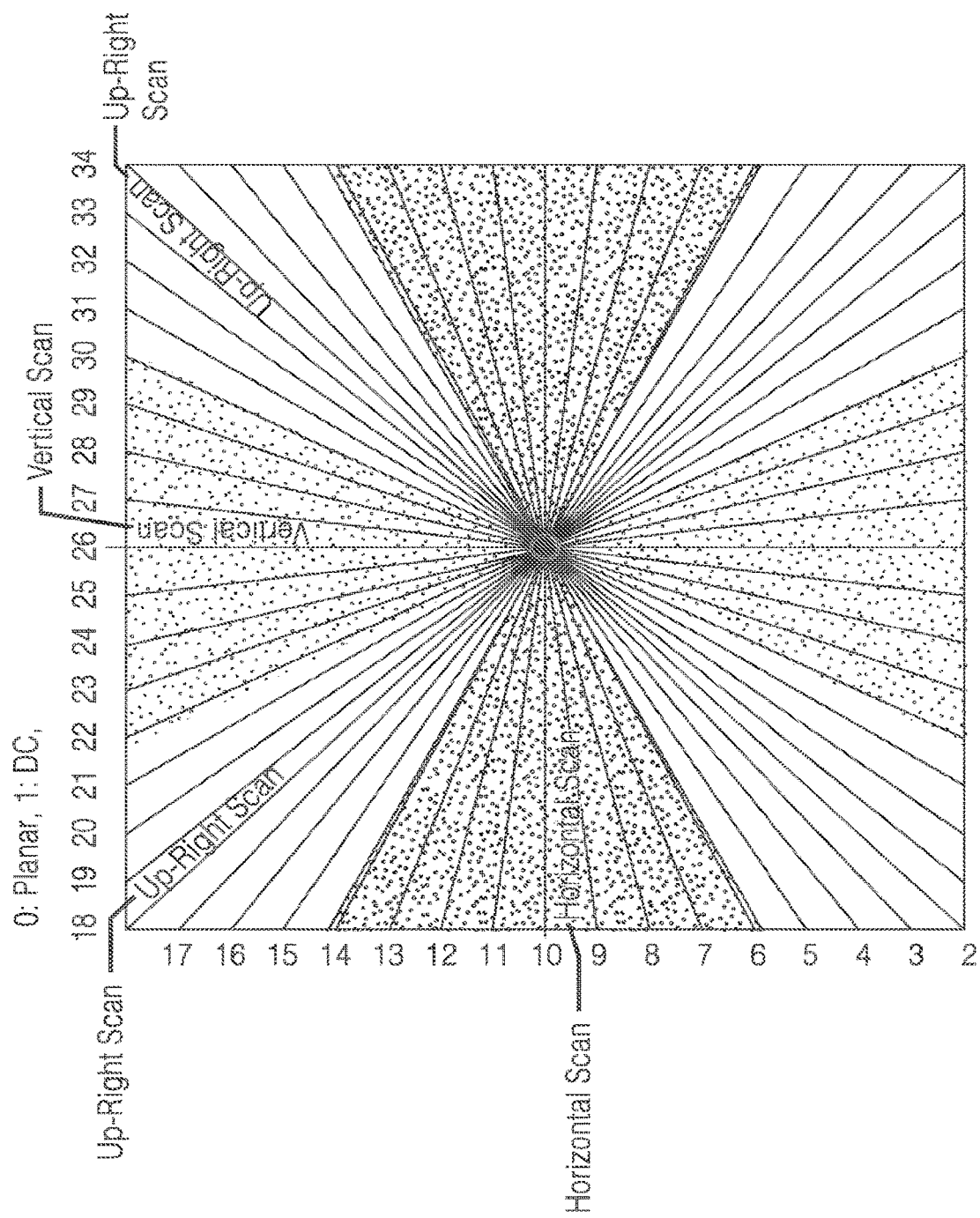
FIG. 3 is a map of logical intra mode naming according to an embodiment of the present invention, showing directions for each logical name.

FIG. 3 illustrates an example embodiment of intra mode numbering utilized according to an embodiment of the present invention, showing a simple monotonic sequence, exemplified with sequential numbering from 2 through 34, whose angles pass through various horizontal, up-right diagonal scan (shown as up-right scan for brevity) and vertical scans. Direction 0 represents Planar, and 1 represents DC, which are not shown in the figure.

It should be appreciated that a function based on a subset of real numbers with real values is called monotonic, if all x and y with x≤y has f(x)≤f(y) for monotonically increasing, or with x≥y for f(x)≥f(y) for monotonically decreasing, thereby preserving the order. Embodiments of the present invention can be implemented with any desired alternative number sequences, in particular monotonic number sequences, without departing from the teachings of the present invention. It should be appreciated that the index of the scan can be easily derived by calculating the distance of the mode from vertical and horizontal directions. Therefore, the look-up table g_aucIntraDirToScanIdx [MAX_CU_DEPTH][NUM_INTRA_MODE] can be removed.

Similarly, in intra mode smoothing, the angular offset from both horizontal and vertical can be readily determined in response to numerical displacement, such as utilizing simple comparisons by addition and subtraction from logical intra mode naming. Thus, intra mode smoothing is performed in response to the amount of angular difference found between logical intra mode names (which represent angular offsets from horizontal and/or vertical). For example, with the minimum of these numerical displacements compared against a pre-determined value stored in a much smaller look-up table, such as of size 5 rather than 5×36 array in current test model of HEVC (HM5.0). If the minimum numerical displacement (angular difference) is larger than the value of the table for the corresponding block size, then smoothing is applied. Therefore, the table can be reduced from m_aucIntraFilter[5][NUM_INTRA_MODE] to m_aucIntraFilter[5]={10, 7, 1, 0, 10}. A value of 10 is sufficiently large to prevent smoothing from being applied to any intra mode for that block size. Using this table, the modes for which smoothing is applied are exactly the same as HEVC test model HM 5.0, yet the table size is reduced.

In coding systems in which mode dependent transforms are based on intra modes, the tables for mode dependent transforms (e.g., Discrete Sine Transforms and Discrete Cosine Transforms (DST and DCT)), can also be removed in a similar fashion, in view of using the logical mode numbers. For a two dimensional 4×4 transform, a one dimensional vertical transform is followed by a one dimensional horizontal transform. The vertical DST is applied to the planar mode and to modes 11 through 34 for vertical transform. The remainder of the modes use vertical DCT transform. Horizontal DST is, on the other hand, applied to planar mode and to modes 2 through 25 for horizontal transform. The remainder of the modes use the horizontal DCT transform, whereby tables g_aucDCTDSTMode_Hor and g_aucDCTDSTMode_Vert in HM5.0 can be safely removed. It will be noted that both horizontal and vertical DST are performed for the planar mode. The invention can be similarly implemented in cases when a single transform is applied regardless of intra mode.

In addition, in response to using this form of logical mode numbers, instead of bit stream mode naming, the table which maps logical and bit stream numbers, such as g_aucAngIntraModeOrder [NUM_INTRA_MODE] in HM5.0, is no longer necessary.

The present invention can be extended to any desired number of Most Probable Modes (MPMs), the following example describing extension to three MPMs. In certain HEVC coding systems there are 35 intra modes for 8×8, 16×16, and 32×32 PU sizes, while 4×4 PUs however, consider only 18 modes. The rationale is to have the number of modes as a structure with 3 MPMs+x, where x is the number of remaining modes. The present invention, thus provides a full symmetric approach with no gain in which x is a power of two. So in a 4×4 the value of x is 16, while in others x is equal to 32. With this full symmetric approach, there are 19 and 35 modes for 4×4 and larger PUs (e.g., 8×8/16×16/32×32), respectively, which corresponds to 3 modes in addition to a full power of 2. Consequentially, if 3 MPMs are allowed, there will be exactly 16 and 32 remaining modes for 4×4 and larger (e.g., 8×8/16×16/32×32) PUs, respectively, thus eliminating the need of any escape codes that are currently needed in the software design.

It should be noted that the introduction of a third MPM adds no additional complexity or memory-context requirements. The 3 MPMs are derived using simple operations without any look-up tables as seen in Table 1 in which the value of δ is 2 for 4×4 PUs and 1 for the rest of the PU sizes in HM 5.0 and the value can vary in general. One of ordinary skill in the art will appreciate that the values of δ and the look up tables can be implemented in various alternative ways without departing from the teachings of the invention. It should be appreciated that the table basically indicates how to set MPMs from neighboring blocks, as seen in more detail in FIGS. 4A and 4B, described in a later section.

Implementing the inventive elements into an HEVC coding system (e.g., test model HM 5.0) can provide a number of benefits. For regularity, 19 luma intra prediction modes are assumed for 4×4 PUs as mentioned in the previous section. This additional mode, however, has no additional gain (as verified by other contributions) and is merely added for the sake of symmetry and improved design. A small gain was found in BD-rate performance based on the use of the intra mode renaming, the small gain due to improved mapping from 35 modes to 19 modes in 4×4 PUs, as previously described. If 3 MPM is utilized, the BD-rate performance with the inventive 3-MPM method under the common test condition are improved, as seen in Table 2. It should be noted that no additional context is defined even for the case of 3 MPMs.

FIGS. 4A and 4B illustrate MPM derivation according to the invention, shown as generalized pseudo-code. In FIG. 4A the decisions are shown for the condition if iLeftIntraDir is equal to iAboveIntraDir, while in FIG. 4B decisions are otherwise shown for when iLeftIntraDir is not equal to iAboveIntraDir. These are described in a more readily understood form in FIG. 5 and FIG. 6, respectively.

Figure 5:
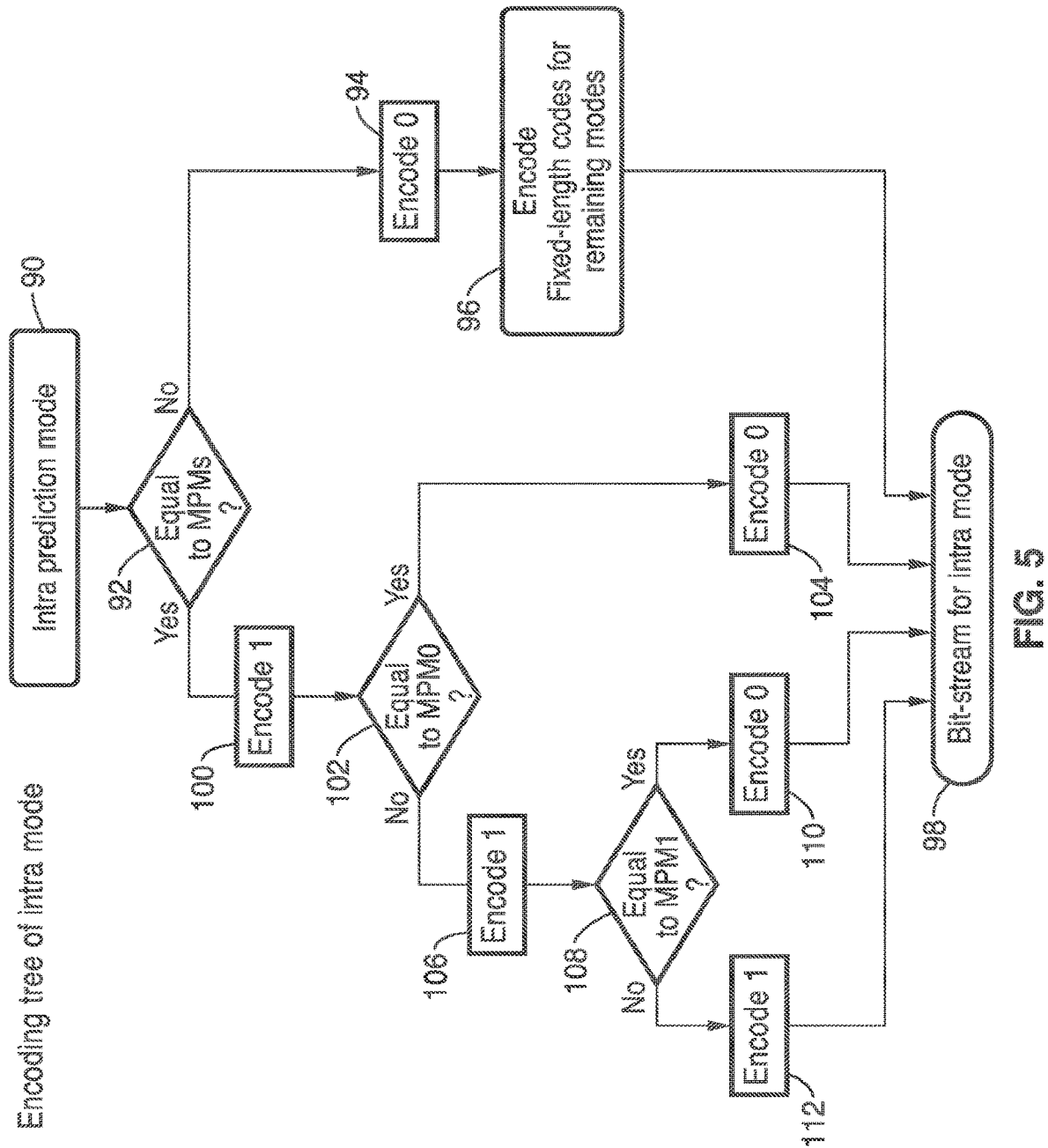
FIG. 5 is a flow diagram of an encoding tree for intra mode operation according to an embodiment of the present invention.

FIG. 5 illustrates an intra mode encoding tree for the intra prediction mode 90 of the invention. A determination 92 is made if the intra prediction is equal to one of MPMs. If not equal to any of MPMs then a zero is encoded 94, after which encoding is performed 96 with fixed-length codes for the remaining modes. Otherwise, for MPMs the first bit is encoded 100 as a one. A determination is then made 102 if the mode is MPM0. If it is MPM0 then a zero is encoded 104. If not MPM0 then a 1 is encoded 106, and a determination is made 108 if the mode is MPM1. If it is MPM1 then a zero is encoded 110, and if not MPM1 mode then a one is encoded 112. In any case the bits are inserted in the bit stream for intra mode 98. Even though it seems preferable to perform checking in the order of MPM0, MPM1 and MPM2, one of ordinary skill in the art will appreciate that the sequence of encoding for MPMs, MPM0 and MPM1 can be selected in any desired order and/or the selection of ones and zeros in the above example scenario can be reversed, without departing from the teachings of the present invention. In particular, programming executable on said processor encodes a first bit in a first state indicating that the intra mode is not equal to any of the MPMs, wherein all encoding is according to fixed-length codes for the remaining modes. Alternatively, the first bit is encoded in a second state, inverse to said first state, to indicate that the intra mode is equal to one of the MPMs, whereby subsequent bits after the first bit indicate if MPM0, MPM1 or MPM2 is selected.

Figure 6:
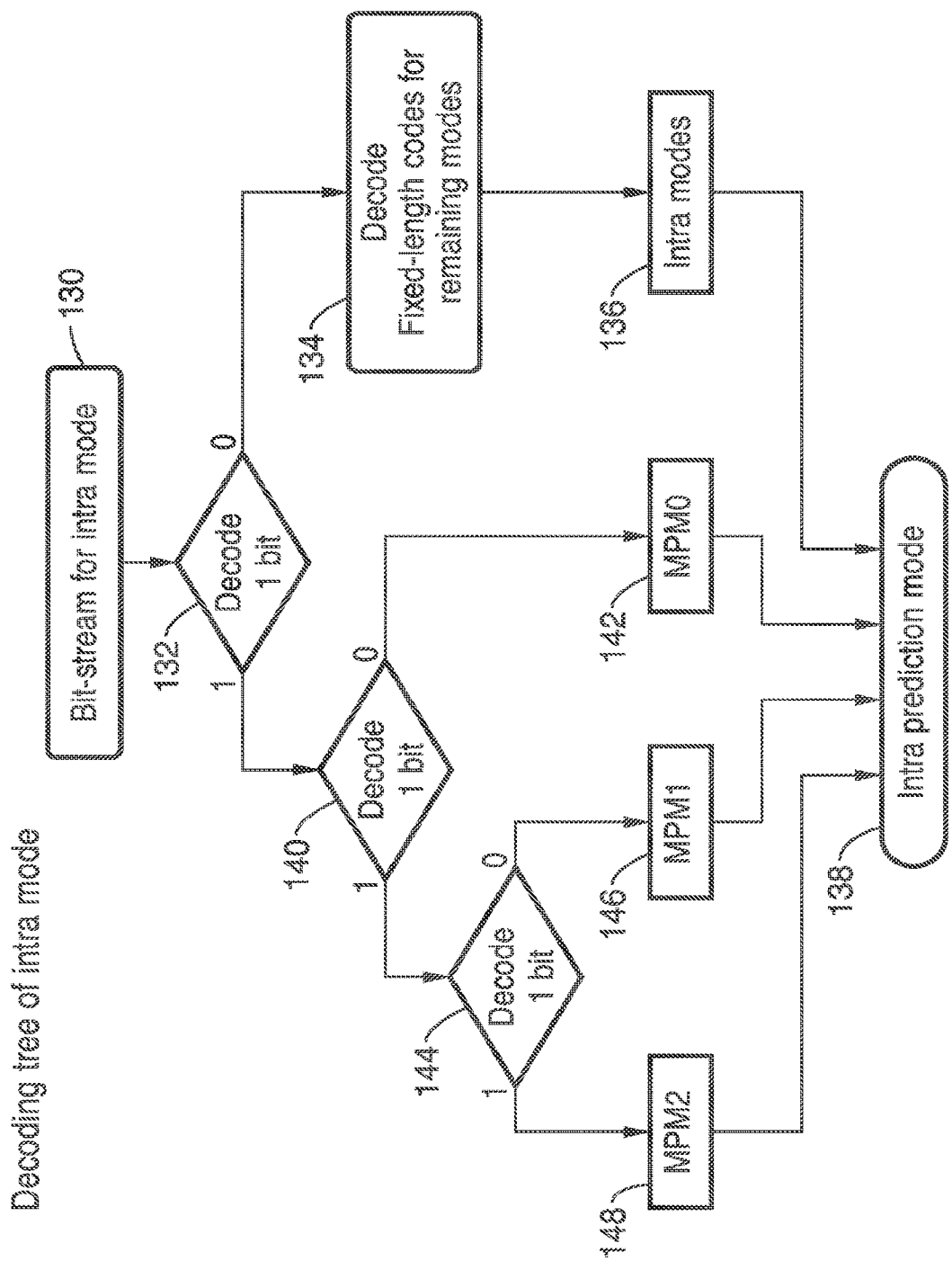
FIG. 6 is a flow diagram of a decoding tree for intra mode operation according to an embodiment of the present invention.

FIG. 6 illustrates an intra mode decoding tree for the invention with a bit stream 130. The first bit is decoded 132, and if it is zero, then fixed length codes are to be decoded for the remaining modes at block 134, and decoded fixed-length code is mapped to intra mode 136, and intra prediction mode is determined 138. If the first decoded bit is a one, then at block 140 the next bit is decoded, and if it is zero MPM0 142 is selected, if one, then block 144 decodes the next bit. If this third bit is a zero, then MPM1 146 is selected, and if a one, then MPM2 148 is selected, all of which continue with determining intra prediction mode 138.

Figure 7A:
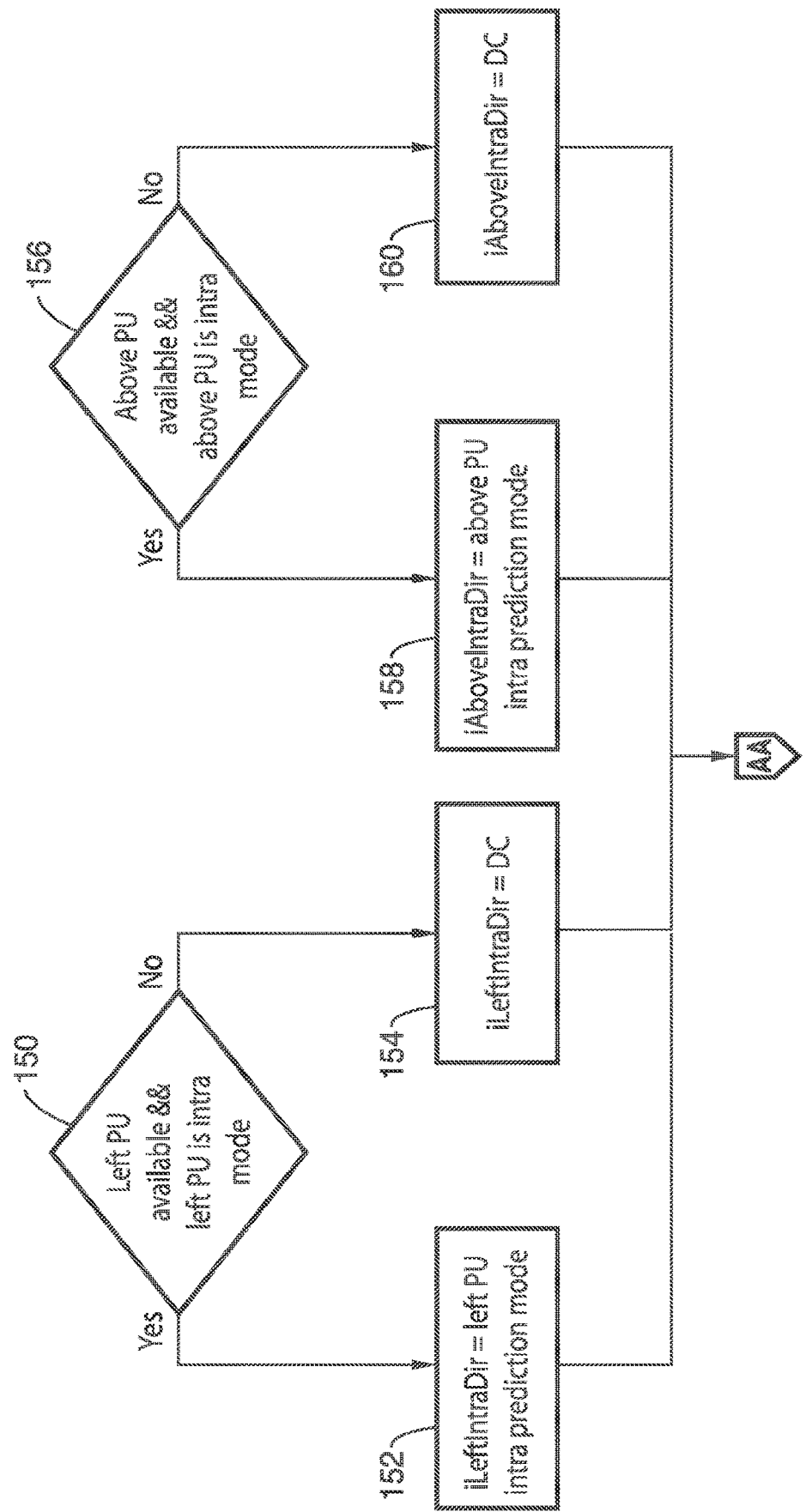
FIGS. 7A and 7B are flow diagrams of determining three MPMs according to an embodiment of the present invention.
Figure 7B:
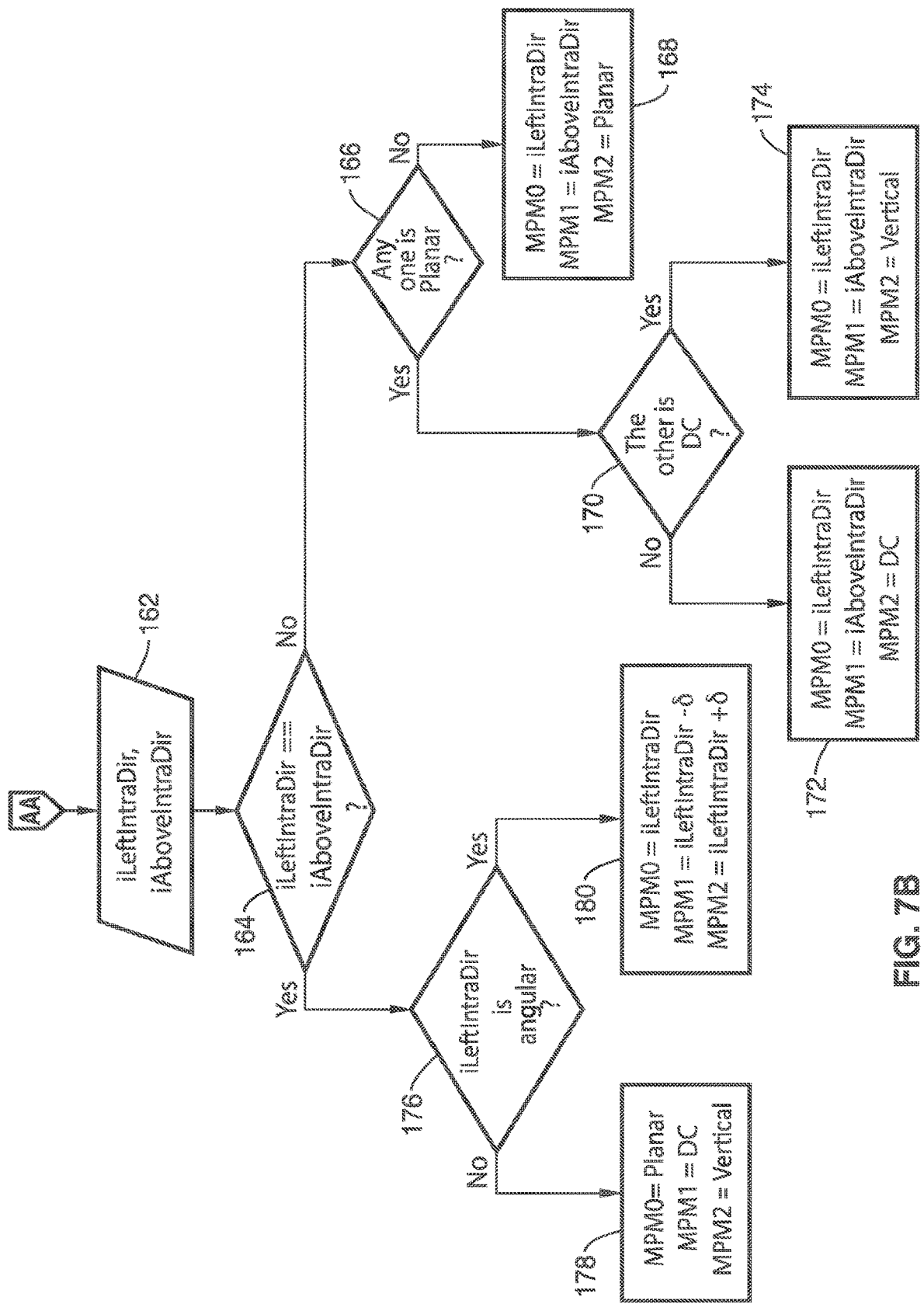

FIGS. 7A and 7B illustrate an example embodiment of determining 3 MPMs, as utilized in both the encoder and decoder to assist encoding and decoding of intra prediction modes. In decision 150, the value iLeftIntraDir is set to the intra prediction mode of left neighboring PU in block 152 if left neighboring PU is intra coded (mode), otherwise iLeftIntraDir is set to DC in block 154. In decision 156 the value iAboveIntraDir is set to the intra prediction mode of above neighboring PU in block 158 if above neighboring PU is intra coded, otherwise iAboveIntraDir is set to DC in block 160. Using iLeftIntraDir and iAboveIntraDir 162, if these are not equal in block 164, then in block 166 a check is made to see if any one is planar. If not planar then MPM0 is set to iLeftIntraDir mode, MPM1 set to iAboveIntraDir mode, and MPM2 set to Planar mode in block 168. If any are planar, then block 170 determines if the other is DC. If it is not DC, then in block 172 MPM0 is set to iLeftIntraDir, MPM1 is set to iAboveIntraDir, and MPM2 is set to DC. If the other is DC, then at block 174 MPM0 is set to iLeftIntraDir, MPM1 is set to iAboveIntraDir, and MPM2 is set to Vertical. Returning to block 164, if iLeftIntraDir is equal to iAboveIntraDir then block 176 checks if iLeftIntraDir is angular. For non-angular iLeftIntraDir at block 178 MPM0 is set to Planar, MPM1 is set to DC, and MPM2 is set to Vertical. For angular iLeftIntraDir at block 180 MPM0 is set to iLeftIntraDir, MPM1 is set to iLeftIntraDir−δ, and MPM2 is set to iLeftIntraDir+δ, where the value of δ is 2 for 4×4 PUs and 1 for the rest of the PU sizes in HM5.0. Again, one of ordinary skill in the art will recognize that differing values may be utilized without departing from the teachings of the present invention.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the invention can be embodied in various ways, including the following:

1. An apparatus for encoding and decoding video signals, comprising: (a) a video encoder having a computer processor; (b) programming executable on said video encoder computer processor for: (i) selecting intra prediction types and modes in a prediction unit and encoding with logical intra mode naming each said mode having a mode number, wherein each mode number in said logical intra mode naming is associated with an angular direction as a monotonic sequence including representations for DC mode, planar mode, and a plurality of directions, and utilizing said logical intra mode naming for decisions made during intra prediction and entropy encoding; and (ii) deriving a scan index from said intra mode naming by calculating distance of each said mode from vertical and horizontal directions for use in making said decisions during intra prediction and entropy encoding; (c) a video decoder having a computer processor; and (d) programming executable on said video decoder computer processor for receiving from said video encoder most probable modes (MPMs) and intra prediction types and modes, and utilizing logical intra mode naming (LIMN) for making decisions during entropy decoding and intra prediction.

2. The apparatus of any preceding embodiment, wherein said video encoder and said video decoder are configured for high efficiency video coding (HEVC), utilizing coding units (CUs) having variable block sizes depending on video content, which are split into smaller blocks for prediction as Prediction Units (PUs) or transform as Transform Units (TUs).

3. The apparatus of any preceding embodiment, wherein said plurality of directions represent directions spanning through horizontal scans, up-right diagonal scans and vertical scans.

4. The apparatus of any preceding embodiment, further comprising programming executable on said video encoder computer processor for determining multiple most probable modes (MPMs) of intra mode directions for communication to the decoder.

5. An apparatus for video encoding, comprising: (a) a video encoder having a computer processor; and (b) programming executable on said computer processor for: (i) selecting intra prediction types and modes of a prediction unit (PU); (ii) encoding said prediction types and modes of the prediction units using logical intra mode naming in which each mode has a mode number that is associated with an angular direction as a monotonic sequence including representations for DC mode, planar mode, and a plurality of directions, and (iii) outputting said logical intra mode naming for use by a decoder in determining prediction types and modes based on said logical intra mode naming 6. The apparatus of any preceding embodiment, wherein said video encoder is a high efficiency video coding (HEVC) encoder, utilizing coding units (CUs) having variable block sizes depending on video content, which are split into smaller blocks for prediction as Prediction Units (PUs) or transform as Transform Units (TUs).

7. The apparatus of any preceding embodiment, wherein said plurality of directions represent directions spanning through horizontal scans, up-right diagonal scans and vertical scans.

8. The apparatus of any preceding embodiment, wherein said programming executable on said computer processor is configured to utilize an association between logical intra mode names and angular directions to simplify decision logic and look-up tables.

9. The apparatus of any preceding embodiment, wherein said look-up tables are selected from the group of tables consisting of intra prediction, intra smoothing, mode dependent coefficient scan and mode dependent transform.

10. The apparatus of any preceding embodiment, further comprising programming executable on said computer processor for encoding most probable modes (MPMs) of intra mode directions.

11. The apparatus of any preceding embodiment, further comprising programming executable on said computer processor for encoding a first bit in a first state indicating that intra prediction mode is not equal to any MPMs, wherein all encoding is according to fixed-length code for remaining modes; and encoding said first bit in a second state, inverse to said first state, indicating that intra prediction mode is equal to one of MPMs, with subsequent bits after said first bit indicating if MPM0, MPM1 or MPM2 is selected.

12. The apparatus of any preceding embodiment, further comprising programming executable on said computer processor for performing prediction at the prediction unit (PU) level, from samples already decoded in adjacent prediction units (PUs).

13. The apparatus of any preceding embodiment, further comprising programming executable on said computer processor for executing intra mode smoothing in response to the amount of angular difference between logical intra mode names.

14. The apparatus of any preceding embodiment, further comprising programming executable on said computer processor for applying smoothing if amount of angular difference is larger than the value of a table for a corresponding block size.

15. The apparatus of any preceding embodiment, further comprising: programming executable on said computer processor for processing a two dimensional 4×4 transform as a one dimensional vertical transform followed by a one dimensional horizontal transform; wherein directional modes have values of 2 through 34; wherein a vertical discrete sine transform (DST) is applied to the planar mode and to modes 11 through 34 for vertical transform, with remaining modes using vertical discrete cosine transform (DCT); and wherein a horizontal DST is applied to planar mode and to modes 2 through 25 for horizontal transform.

16. An apparatus for decoding video signals, comprising: (a) a decoder having a computer processor configured for decoding video frames; and (b) programming executable on said computer processor for: (i) receiving intra prediction types and modes and most probable modes (MPMs) for prediction units (PUs) utilizing logical intra mode naming (LIMN) from an encoder; (ii) wherein each logical mode number is associated with an angular direction as a monotonic sequence whose numbers include representations for DC mode, planar mode, and a plurality of directions; and (iii) making entropy decoding and intra prediction decisions based on received values encoded with logical intra mode naming (LIMN).

17. The apparatus of any preceding embodiment, wherein said video decoder is a high efficiency video coding (HEVC) encoder, utilizing coding units (CUs) having variable block sizes depending on video content which are split into smaller blocks for prediction as Prediction Units (PUs) or transform as Transform Units (TUs.

18. The apparatus of any preceding embodiment, further comprising programming executable on said computer processor for decoding three of said most probable modes (MPMs) as received from an encoder.

19. The apparatus of any preceding embodiment, further comprising programming executable on said computer processor for decoding a first bit that in a first state indicates that intra prediction mode is not set to any MPMs wherein all encoding is according to fixed-length code for remaining modes; and decoding said first bit in a second state, inverse to said first state, which indicates that intra prediction mode is equal to one of MPMs, with subsequent bits after said first bit indicating if MPM0, MPM1 or MPM2 is selected.

20. The apparatus of any preceding embodiment, further comprising: programming executable on said computer processor for processing a two dimensional 4×4 transform as a one dimensional vertical transform followed by a one dimensional horizontal transform; wherein directional modes have values of 2 through 34; wherein a vertical discrete sine transform (DST) is applied to the planar mode and to modes 11 through 34 for vertical transform, with remaining modes using vertical discrete cosine transform (DCT); and wherein a horizontal DST is applied to planar mode and to modes 2 through 25 for horizontal transform.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

DERIVATION OF 3 MPMS

| Neighbouring modes condition | MPMs (three MPMs) |
|---|---|
| iLeftIntraDir == iAboveIntraDir | iLeftIntraDir, iLeftIntraDir− δ, iLeftIntraDir+ δ |
| iLeftIntraDir != iAboveIntraDir | iLeftIntraDir, iAboveIntraDir, Planar/DC |

TABLE 2

RESULTS FOR INTRA MODE NAME MODIFICATION FOR 3MPM

|  | All Intra HE | | | All Intra LC | | |
|---|---|---|---|---|---|---|
|  | Y | U | V | Y | U | V |
| Class A (8bit) | −0.29% | −0.13% | 0.00% | −0.38% | −0.15% | −0.09% |
| Class B | −0.20% | −0.07% | −0.06% | −0.28% | −0.07% | −0.06% |
| Class C | −0.25% | −0.13% | −0.16% | −0.32% | −0.17% | −0.18% |
| Class D | −0.21% | −0.07% | −0.09% | −0.24% | −0.10% | −0.13% |
| Class E | −0.33% | −0.25% | −0.05% | −0.42% | −0.13% | −0.15% |
| Overall | −0.25% | −0.12% | −0.08% | −0.31% | −0.12% | −0.12% |
|  | −0.25% | −0.13% | −0.08% | −0.31% | −0.12% | −0.13% |
| Class F | −0.33% | −0.35% | −0.28% | −0.33% | −0.38% | −0.45% |
| Enc Time [%] |  | 100% |  |  | 100% |  |
| Dec Time [%] |  | 100% |  |  | 100% |  |

What is claimed is:

1. An image processing apparatus, comprising:
a memory configured to store instructions to encode an image; and
a processor configured to execute the instructions to:
select, for a current block of the image, candidate intra prediction modes based on:
a first intra prediction mode for a left neighboring block that is unequal to a second intra prediction mode for an above neighboring block, wherein the left neighboring block and the above neighboring block are adjacent to the current block, and
each of the first intra prediction mode and the second intra prediction mode is a non-planar prediction mode;
set a first mode number corresponding to the first intra prediction mode, as 0;
set a second mode number corresponding to the second intra prediction mode, as 1;
set a third mode number corresponding to a planar prediction mode, as 2;
select, as a third intra prediction mode, one of the candidate intra prediction modes based on the first mode number, the second mode number, and the third mode number; and
execute an intra prediction based on the third intra prediction mode.

2. The image processing apparatus of claim 1, wherein the processor is further configured to execute the instructions to:
  generate, for the third intra prediction mode, a bit stream including at least one of the first mode number, the second mode number, or the third mode number; and
  encode the image based on the generated bit stream.

3. The image processing apparatus of claim 1, wherein a number of the candidate intra prediction modes is 3.

4. The image processing apparatus of claim 1, wherein the left neighboring block and the above neighboring block are Transform Units.

5. The image processing apparatus of claim 1, wherein the left neighboring block and the above neighboring block are Prediction Units.

6. The image processing apparatus of claim 1, wherein the candidate intra prediction modes are intra prediction modes from most probable modes (MPMs).

7. A method, comprising:
  selecting, for a current block of an image, candidate intra prediction modes based on:
    a first intra prediction mode for a left neighboring block that is unequal to a second intra prediction mode for an above neighboring block, wherein the left neighboring block and the above neighboring block are adjacent to the current block; and
    each of the first intra prediction mode and the second intra prediction mode is a non-planar prediction mode;
  setting a first mode number corresponding to the first intra prediction mode, as 0;
  setting a second mode number corresponding to the second intra prediction mode, as 1;
  setting a third mode number corresponding to a planar prediction mode, as 2;
  selecting, as a third intra prediction mode, one of the candidate intra prediction modes based on the first mode number, the second mode number, and the third mode number; and
  executing an intra prediction based on the third intra prediction mode.

8. The method of claim 7, further comprising:
  generating, for the third intra prediction mode, a bit stream including at least one of the first mode number, the second mode number, or the third mode number; and
  encoding the image based on the generated bit stream.

9. The method of claim 7, wherein the left neighboring block and the above neighboring block are Transform Units.

10. The method of claim 7, wherein the left neighboring block and the above neighboring block are Prediction Units.

11. The method of claim 7, wherein the candidate intra prediction modes are intra prediction modes from most probable modes (MPMs).

12. The method of claim 7, wherein a number of the candidate intra prediction modes is 3.

\* \* \* \* \*